US008561968B2

(12) United States Patent
Roodenburg et al.

(10) Patent No.: US 8,561,968 B2
(45) Date of Patent: Oct. 22, 2013

(54) MARINE LOAD RAISING AND LOWERING SYSTEM

(75) Inventors: Joop Roodenburg, Delft (NL); Terence Willem August Vehmeijer, The Hague (NL)

(73) Assignee: ITREC B.V., Schiedam (NL)

( * ) Notice: Subject to any disclaimer, the term of this patent is extended or adjusted under 35 U.S.C. 154(b) by 793 days.

(21) Appl. No.: 12/665,678

(22) PCT Filed: Jun. 22, 2007

(86) PCT No.: PCT/NL2007/000157
§ 371 (c)(1),
(2), (4) Date: Jun. 21, 2010

(87) PCT Pub. No.: WO2009/002142
PCT Pub. Date: Dec. 31, 2008

(65) Prior Publication Data
US 2010/0266371 A1    Oct. 21, 2010

(51) Int. Cl.
*B66D 1/50* (2006.01)
(52) U.S. Cl.
USPC ........... 254/275; 254/278; 254/269; 254/271; 254/273; 254/274; 254/283; 254/284
(58) Field of Classification Search
USPC ......... 254/278, 269, 270, 271, 273, 274, 275, 254/283, 284
See application file for complete search history.

(56) References Cited

U.S. PATENT DOCUMENTS

| 3,265,360 | A | * | 8/1966 | Tax | 254/270 |
|---|---|---|---|---|---|
| 3,531,088 | A | * | 9/1970 | Kraschnewski | 254/292 |
| 3,606,256 | A | * | 9/1971 | Ovretviet | 254/275 |
| 5,579,931 | A | | 12/1996 | Zuehlke et al. | |
| 5,951,227 | A | | 9/1999 | Calkins et al. | |
| 6,651,961 | B1 | * | 11/2003 | Meyer | 254/337 |
| 6,956,339 | B1 | * | 10/2005 | Kureck et al. | 318/85 |
| 7,416,169 | B2 | * | 8/2008 | Noeske et al. | 254/275 |
| 7,641,421 | B2 | * | 1/2010 | Roodenburg et al. | 405/166 |
| 2011/0260126 | A1 | * | 10/2011 | Willis | 254/283 |

FOREIGN PATENT DOCUMENTS

WO    WO-2006/013053 A1    2/2006

* cited by examiner

*Primary Examiner* — Emmanuel M Marcelo
(74) *Attorney, Agent, or Firm* — Birch, Stewart, Kolasch & Birch, LLP

(57) ABSTRACT

The invention relates to a subsea marine load raising and lowering system (1) for use on a vessel, preferably a vessel for laying an offshore pipeline, which system comprises first and second winches (2, 6) for raising or lowering first and second cable portions (4, 8) connected via an equalizing sheave (11), to the axle (12) of which a load connector (13) is connected. The system comprises operating means to perform synchronous raising or lowering of the cable portions. The system further comprises overload protection systems provided at both winches, and a safety assembly (15) preventing any substantial further movement of the cable portions (4, 8) in case the cable portions do not operate synchronously, comprising a structure (15a) mounted to the axle (12) of the equalizing sheave (11) having passages (15c) for the cable portions and further comprising stops (15b) arranged on each cable portion above and in the vicinity of the structure (15a). The safety assembly is arranged such that one of the stops will abut the structure (15a) upon relative movement of first and second cable portion (4, 8) such that the other cable portion is subjected to an increased tension and the overload protection system of that other cable portion will enter into force.

7 Claims, 5 Drawing Sheets

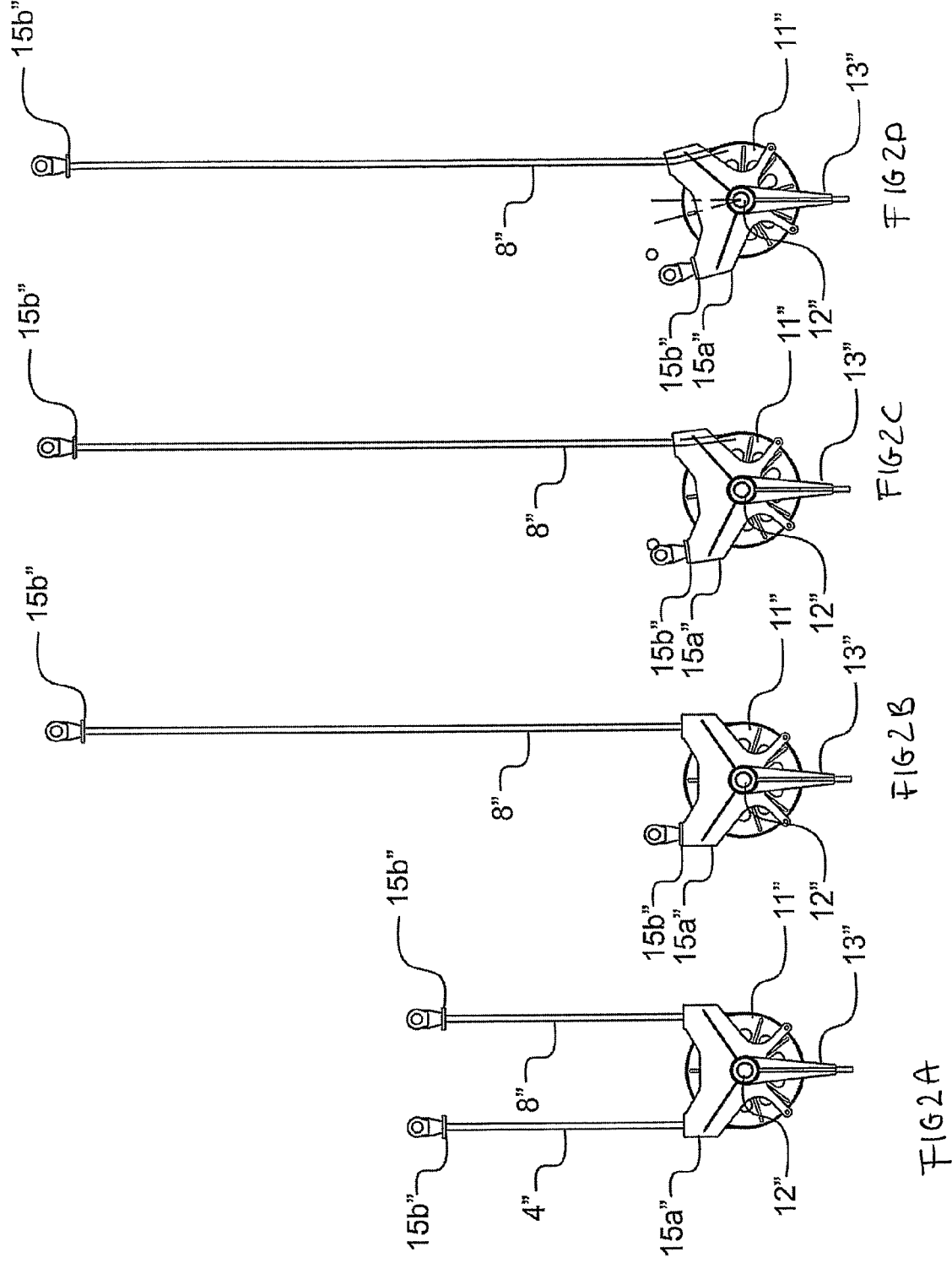

MARINE LOAD RAISING AND LOWERING SYSTEM

The present invention relates to a subsea marine load raising and lowering system for use on a vessel, preferably a vessel for laying an offshore pipeline, which system comprises a first winch comprising first driving means for raising or lowering a first cable portion from the winch.

Such a system is well known, for example on vessels used for laying pipelines. The system is then used in particular for abandoning and recovering a pipeline, to which system and method are referred to as an A&R system and an A&R method. During pipelaying, it is sometimes necessary to abandon a pipeline and recover it later. For example, a pipeline might need to be abandoned due to weather conditions or alternatively for the vessel to be loaded with pipeline, e.g. on a reel. Conventionally, such A&R method is carried out by connecting an A&R head to the end of the laid pipeline; connecting a cable to this head; transferring pipeline tension from a pipeline tensioning arrangement on the vessel that is used during pipelaying to a winch via the cable; and laying the pipeline and the head on the bottom of the sea by controlled lowering of the cable via driving means of the winch.

However, similar marine load raising and lowering systems comprising a winch, driving means and a cable portion are used e.g. for lowering and placing equipment onto the sea bed, e.g. drilling templates, BOP valves or other subsea equipment.

The use of conventional marine load raising and lowering systems in deep water, e.g. several hundreds meters or even more than one kilometer causes several problems. The cable associated with the winch must have a very high tensile strength to support a heavy load. This requirement leads to a heavy cable with the result that the weight of the cable itself becomes a further factor. Thus an even higher load capacity of the winch will be required.

This problem is solved in a known manner by providing a second winch comprising second driving means for raising or lowering a second cable portion from the second winch. Operating means are provided which are connected to the first and second driving means of the first and second winch for synchronising the driving means so as to perform synchronous raising or lowering of the first and second cable portions. The first cable portion and second cable protion are interconnected at the lower ends via a rotatable equalizing sheave. This sheave will rotate when the operation of the first and second cable portions is not fully synchronous, thereby preventing overload of the cable portions when only a small deviation of synchronicity occurs. The load connector, to which the load is or can be attached, is connected to the axle of the equalizing sheave.

Hence, the load is distributed over the two cable portions and the two winches. To equally distributed the load, it is necessary for the first and second driving means to perform synchronous raising or lowering of the cable portions. This is achieved by operating means, preferably electronic operating means.

A load may be connected to the load connector, which is connected to the axle of the equalizing sheave. The equalizing sheave is rotatable around the axle, usually embodied as a central shaft, which is commonly fixed in position with a bearing or bushing or the like sitting inside a hole in the sheave to allow the sheave to rotate around the axle.

The risk associated with non-synchronous operation is that one of the cable portions is subjected to the entire load, which will cause the cable portion to be overloaded or even to break. This risk is unacceptable.

An example of a safety device for a load raising and lowering system as indicated above is described for a conventional liftcrane in U.S. Pat. No. 5,579,931. The described safety device comprises a sensor responsive to relative movement of the first and second cable. In particular, it is described that the ends of the first and second cable portion are linked together, and that the sensor detects any shifting of the linked ends of the cable portions.

Alternatively, sensors detecting the speed of the first and second cable portion may be provided, responsive to relative movement of the first and second cable portion. Hence, in case the cable portions do not operate synchronously, this sensor will give a signal to the operating means to prevent any substantial further raising of lowering of the cable portions.

A disadvantage of such a sensor-based system is that it is not suitable for use in subsea systems under water. Expensive visual detection equipment is necessary to act as a sensor.

Another disadvantage of a sensor giving a signal to the operating means is that it is not very reliable. The function of the operating means is to synchronise the first and second driving means so as to perform synchronous raising or lowering of the cable portions. Only if the operating means of the driving means fail, raising or lowering of the cable portions is not synchronous and a relative movement of the first and second cable portion can be detected by the sensor. A sensor giving a signal to failing operating means is not considered reliable.

The aim of the present invention is to provide a reliable safety assembly for use in a subsea marine load raising and lowering system comprising two winches.

This aim is achieved by the invention according to claim 1, characterized by first and second overload protection systems provided at both winches for stopping the winch when an overload of the associated cable portion is detected, a safety assembly preventing any substantial further raising or lowering of the cable portions in case the cable portions do not operate synchronously, comprising a structure mounted to the axle of equalizing sheave having passages for the cable portions, and further comprising stops arranged on each cable portion above and in the vicinity of the structure, but not interacting with the structure upon normal operation of the subsea marine load raising and lowering system, wherein the safety assembly is arranged such that one of the stops will abut the structure upon relative movement of first and second cable portion such that the other cable portion is subjected to an increased tension and the overload protection system of that other cable portion is activated.

The provision of an overload protection system at a winch is a common measure for interrupting or blocking the driving means when an overload of the cable is detected. Such overload may be detected by load sensors or by detecting an increased displacement rate of a cable portion. An overload protection system may operate mechanically or electronically.

An advantage of the invention is the reliability of the safety assembly. If raising or lowering of the cable portions is not synchronous and a relative movement of the first and second cable portion occurs, e.g. because the (electronic) operating means of the driving means fail, one of the stops arranged on a cable portion will abut the structure. When a stop abuts the structure, the cable portion to which the stop is mounted is subjected to reduced tension and the other cable portion will be subjected to an increased tension. In particular when the cables are relatively elastic, tension in a cable portion will decrease rapidly when a stop abuts the structure. The increased tension in the other cable will activate the overload protection system of the other cable portion when the tension increases to above a tension limit value, interrupting or blocking any substantial further lowering and or raising of this cable portion. Hence, the safety system does not depend on the operating system to prevent further raising or lowering of a cable portion, but on mechanical components and the overload protection system.

The sensitivity of the safety assembly according to the invention can be set by suitable selecting the distance between the stops on the cable portion and the structure. The larger the distance, the larger the margin of speed difference between the cable portions before a stop abuts the structure. The sensitivity is further dependent on the tension limit value upon which the overload protection system of the winches is activated, and upon the accuracy of such overload protection system.

The safety assembly according to the invention has the advantage that it is easy to install, since it only requires mounting a structure to the axle of the equalizing sheave and providing stops on the cables.

The structure of the safety assembly is mounted on the axle of the equalizing sheave, to which also the load connector is connected. Thus, the structure can be held structure at a known position with respect to the equalizing sheave. The structure comprises passages for the cables. Preferably, these passages completely surround each of the cables. The stops are provided on the cable portions above the passages. The passages in the structure should be dimensioned to allow passage of the cables, but not to allow passage of the stops provided on the cables. Upon a relative movement of the cables, one of the stops will abut against the structure.

When the structure is mounted in a fixed orientation with respect to the axle of the equalizing sheave, the structure will immediately prevent any substantial further movement of that cable portion and tension in the cable portion with the abutting stop is decreased. The other cable portion will be subjected to an increased tension which will activate the overload protection system.

Alternatively, the structure is mounted rotatable about the axle of the equalizing sheave. In this embodiment, the structure will pivot about the axle when one of the stops abuts the structure. Such pivoting movement is preferably stopped by blocking means fixedly mounted to the axle of the equalising sheave. Possibly, the pivoting movement is controlled, e.g. by springs, dampers or the like, to provide a gradual decrease in tension of one cable portion and an increase in tension of the other cable portion. In this embodiment, the sensitivity of the safety assembly according to the invention is not only determined by the distance between the stops on the cable and the structure, but also by the extent in which the structure is allowed to pivot.

It is noted that the marine load raising and lowering system according to the invention may be used for abandoning and recovering pipelines on a pipelaying vessel, but may alternatively be used for any other subsea application, e.g. for lowering equipment into the sea and/or onto the sea bed.

Alternatively, the aim is achieved according to a second aspect of the invention by a safety assembly preventing any substantial further movement of the equalizing sheave in case the cable portions do not operate synchronously, comprising a structure mounted to the axle of equalizing sheave and further comprising a stop arranged on the equalizing sheave, not interacting with the structure upon normal operation of the subsea marine load raising and lowering system, wherein the safety assembly is arranged such that the stop will abut the structure upon rotation of the equalizing sheave, occurring upon relative movement of first and second cable portion such that the cable portions will slip over the equalizing sheave.

The invention is further explained with reference to the drawings, in which:

FIG. 1 is a schematic representation of a first embodiment of a subsea marine load raising and lowering system according to the invention;

FIGS. 2a-d is a schematic representation of a second embodiment of a subsea marine load raising and lowering system according to the invention;

Figure 1:
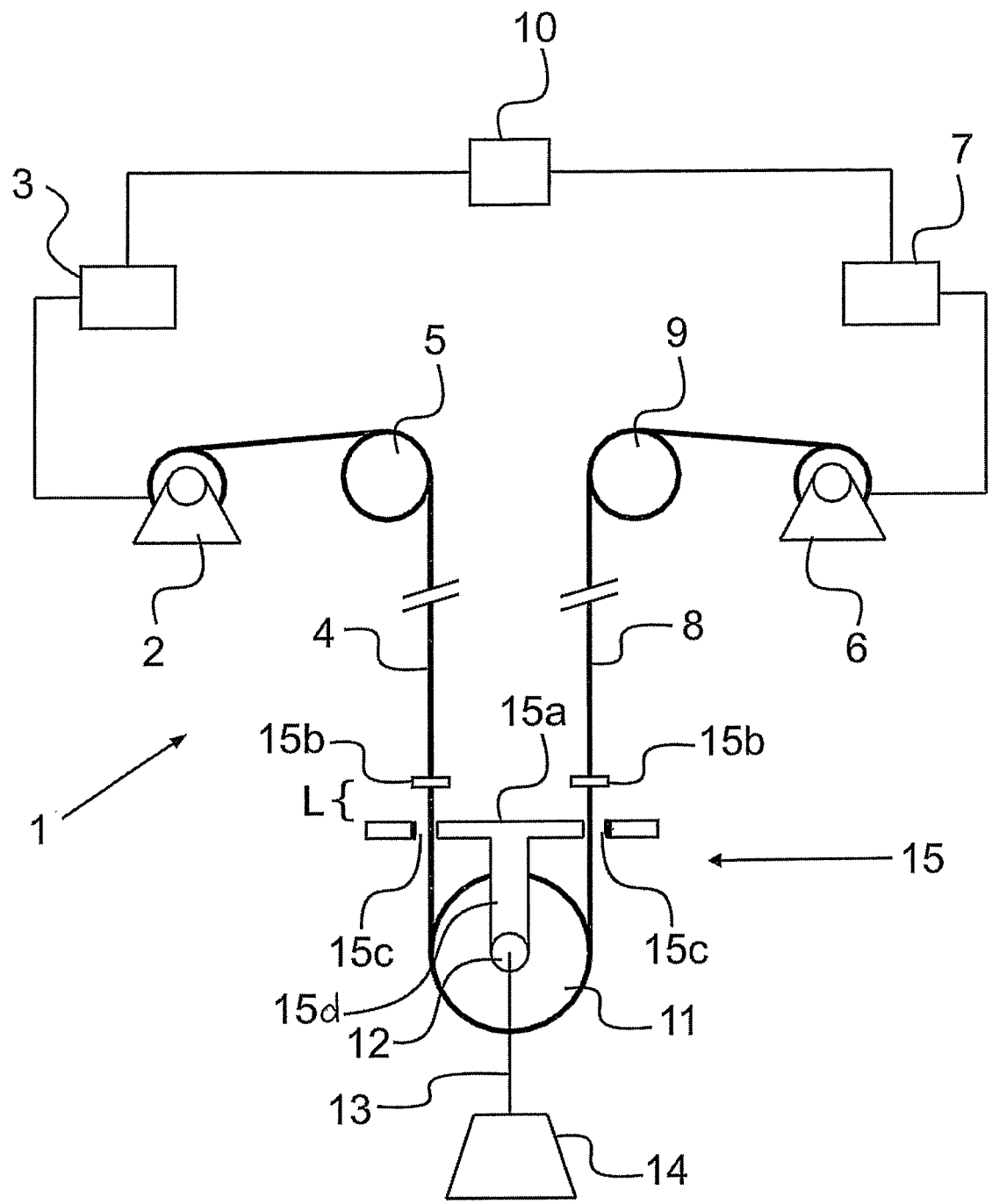

In FIG. 1 a subsea marine load raising and lowering system 1 for use on a vessel, preferably a vessel for laying an offshore pipeline, is shown. The vessel could be any floating structure, e.g. including a (tension-leg) drilling platform, etc.

The system 1 comprises a first winch 2 comprising first driving means 3 for raising or lowering a first cable portion 4 from the winch 2. This cable portion 4 will in practice be very long, but represented here short for reasons of clarity. The first driving means 3 are electronically and/or mechanically connected to the winch 2. The driving means may include any type of motor. First cable portion 4 is suspended via a sheave 5 from the first winch 2. A first overload protection system (not shown) is provided at winch 2 for blocking the winch 2 when an overload of the associated cable portion 4 is detected. The system further comprises a second winch 6 comprising second driving means 7 for raising or lowering a second cable portion 8 from the winch 6. Second cable portion 8 is suspended via a sheave 9. A second overload protection system (not shown) is provided at winch 6 for blocking the winch 6 when an overload of the associated cable portion 8 is detected.

Operating means 10, in this embodiment electronic operating means, are connected to the first and second driving means 3, 7 of the first and second winch 2, 3 for synchronising the driving means so as to perform synchronous raising or lowering of the cable portions 4, 8. Second cable portion 8 is connected to the first cable portion 4 via a rotatable equalizing sheave 11. Equalizing sheave 11 comprises a fixed axle 12. The equalizing sheave 11 rotates around a central shaft, the axle 12, which in this case is fixed in position with a bearing or bushing or the like (not shown) positioned inside a hole in the equalizing sheave 11 to allow the sheave 11 to rotate around the fixed axle 12. A load connector 13 is connected to the fixed axle 12, to which a load 14 can be connected.

A safety assembly 15 is provided to prevent any substantial further raising of lowering of the cable portions 4, 8 in case the cable portions do not operate synchronously. The safety assembly 15 comprises a structure 15a having passages 15c for each of the cable portions 4, 8. During normal operation of normal operation of the marine load raising and lowering system the structure 15a does not interact with the cable portions 4, 8. In the shown embodiment, structure 15a comprises a transverse plate, fixed via a rod part 15d to the axle 12 of the equalizing sheave 11. The safety assembly further comprises stops 15b arranged on each cable portion 4, 8. In a preferred embodiment, the stops may be connectors, used to connect different cable portions together. The stops are provided a distance L above the structure 15a, and do not interact with the structure 15a upon normal operation of the subsea marine load raising and lowering system.

The structure 15a and the stops 15b are arranged such that upon relative movement of first and second cable portion 4, 8, one of the stops 15b will abut the structure 15a. When, for example, cable portion 8 runs faster than cable portion 4, the stop 15b associated with cable portion 8 will abut the structure 15a. The safety assembly 15 prevents any substantial further lowering of cable portion 8 and causes a decrease in tension to which cable portion 8 is subjected. Cable portion 4 is subjected to an increased tension. The overload protection system of winch 2 will enter into force when the tension has increased above the limit set by the overload protection system of winch 2.

The distance L between the structure 15a and the stops 15b forms a margin of cable portion length, indicated with the letter "L", allowed as a margin when cable portions 4 and 8 do not run synchronously, but during which margin the safety assembly does not operate.

According to a preferred embodiment of the invention, the vertically extending parts of cable portions 4 and 8 are made of a different material than the part of the cable portion passing over the equalising sheave 11. The vertical parts can be designed optimal to be subjected to tension, while the part passing over the equalising sheave is also subjected to bending forces and another material may be more appropriate for this purpose. The stops 15b can than be connectors, which are commonly applied to connect different cable portions together.

Figure 2A:
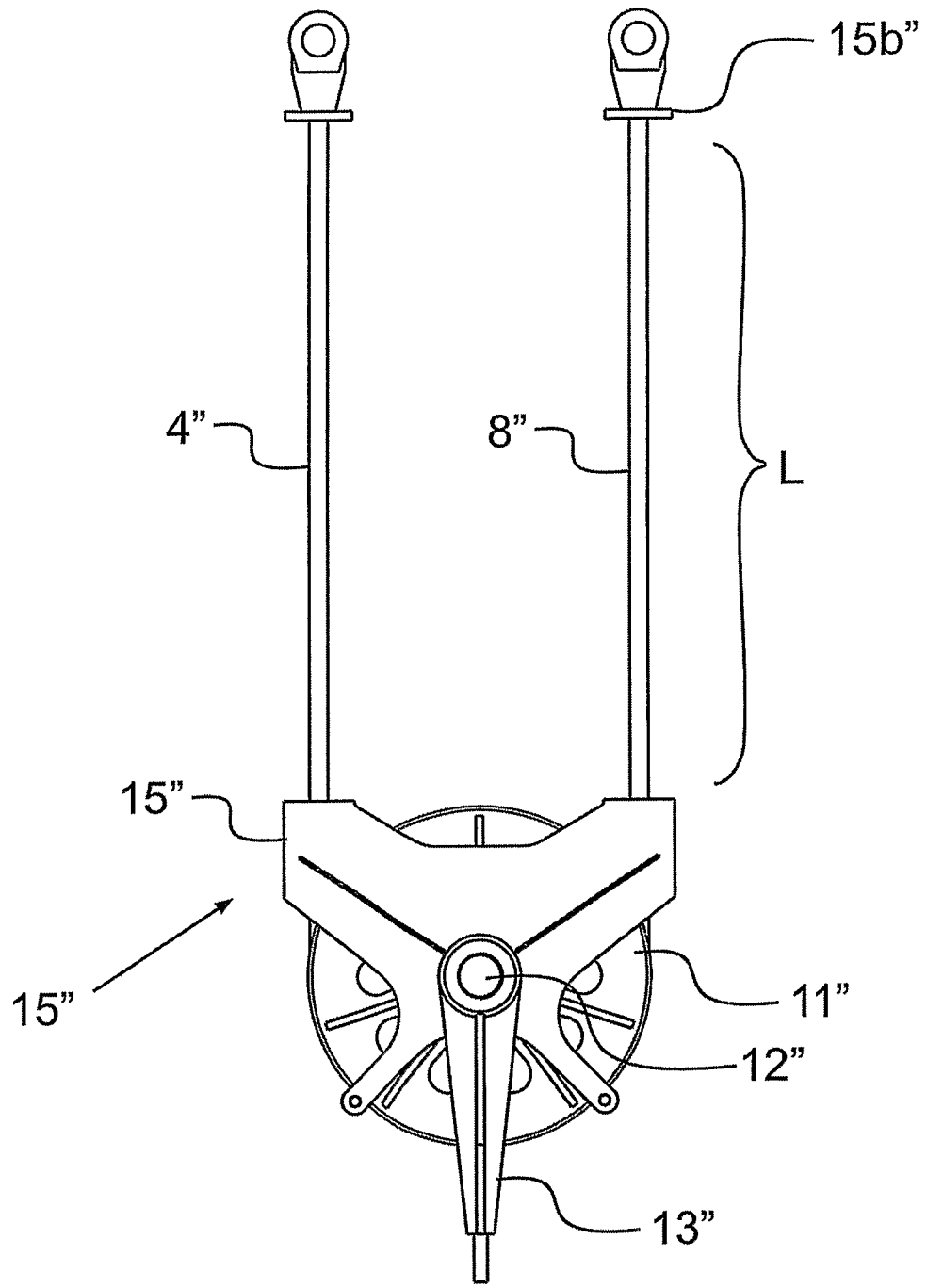

In FIG. 2a an alternative embodiment of a safety assembly 15" is shown, provided to prevent any substantial further raising of lowering of the cable portions 4", 8" in case the cable portions do not operate synchronously. The safety assembly 15" comprises a structure 15a" having passages (not shown) for the cable portions 4", 8". During normal operation of normal operation of the marine load raising and lowering system the structure 15a" does not interact with the cable portions 4", 8". In the shown embodiment, structure 15a" is rotatably mounted to the axle 12" of the equalizing sheave 11". A load connector 13" is likewise connected to the fixed axle 12". The safety assembly further comprises stops 15b" arranged on each cable portion 4", 8". The stops are provided a distance L above the structure 15a", and do not interact with the structure 15a upon normal operation of the subsea marine load raising and lowering system.

Upon relative movement of first and second cable portions 4", 8" the equalizing sheave 11" will rotate, allowing such movement as long as the relative movement does not exceed a cable distance L. The structure 15a" and the stops 15b" are arranged such that after the relative movement of the cables exceeds a cable distance L, one of the stops 15b" will abut the structure 15a'''.

In FIG. 2b the situation is shown in which cable portion 4" has run faster than cable portion 8", resulting in that the stop 15b" associated with cable portion 4" abuts the structure 15a". The safety assembly 15" prevents any substantial further lowering of cable portion 4". In FIGS. 2c and 2d it is shown that safety assembly 15" pivots about axle 12", allowing a slight further relative movement of the cables exceeding distance L. During the pivoting movement, cable portion 8" is subjected to an increased tension. The overload protection system of a winch associated with cable portion 8" will enter into force when the tension has increased above the limit set by the overload protection system of the winch.

Figure 3:
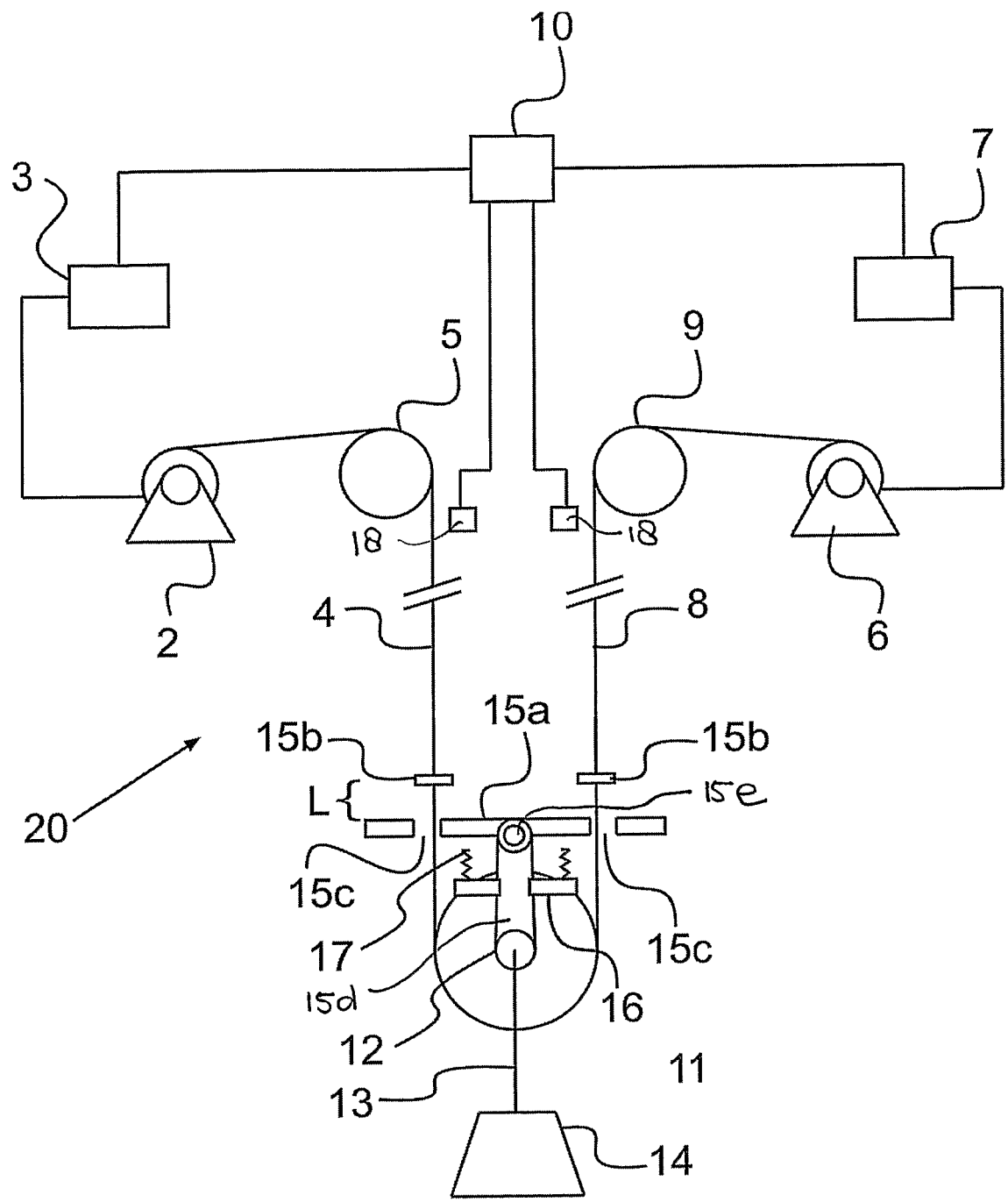
FIG. 3 is a schematic representation of a third embodiment of a subsea marine load raising and lowering system according to the invention.

In FIG. 3 yet an alternative embodiment 20 of a subsea load raising and lowering system is shown. Similar parts are labelled with the same numbers as in FIG. 1. In this embodiment, the structure 15a comprises a transverse plate, pivotably connected via pivot 15e to a rod part 15d, which rod part 15d is fixed to the axle 12 of the equalising sheave 11. The structure 15a is rotatable about the fixed axle 12. In the shown embodiment, displacement sensors 18 are provided, in contact with the electronic operating means 10. The displacement sensors 18 measure the displacement of the first and second cable portion. The electronic operating means 10 analyse these data and correct the driving means of the winches for observed non-synchronous raising or lowering of the cable portions 4, 8.

Upon relative movement of first and second cable portion 4, 8 exceeding cable distance L one of the stops 15b will abut the structure 15a. When, for example, cable portion 8 runs faster than cable portion 4, the stop 15b associated with cable portion 8 will abut the right-hand part of the structure 15a. The structure 15a will pivot about the axle 15e, until the pivoting movement is stopped by blocking means 16. Blocking means 16 are fixedly mounted via rod part 15d to the axle 12 of the equalising sheave 11. In the shown embodiment, the pivoting movement of the structure 15a is controlled by springs 17 to provide a gradual decrease in tension of one cable portion and an increase in tension of the other cable portion. In the above-described example, the safety assembly 15a then prevents any substantial further lowering of cable portion 8 and causes a decrease in tension to which cable portion 8 is subjected. Cable portion 4 is subjected to an increased tension. The overload protection system of winch 2 will enter into force when the tension has increased above the limit set by the overload protection system of winch 2.

Figure 4:
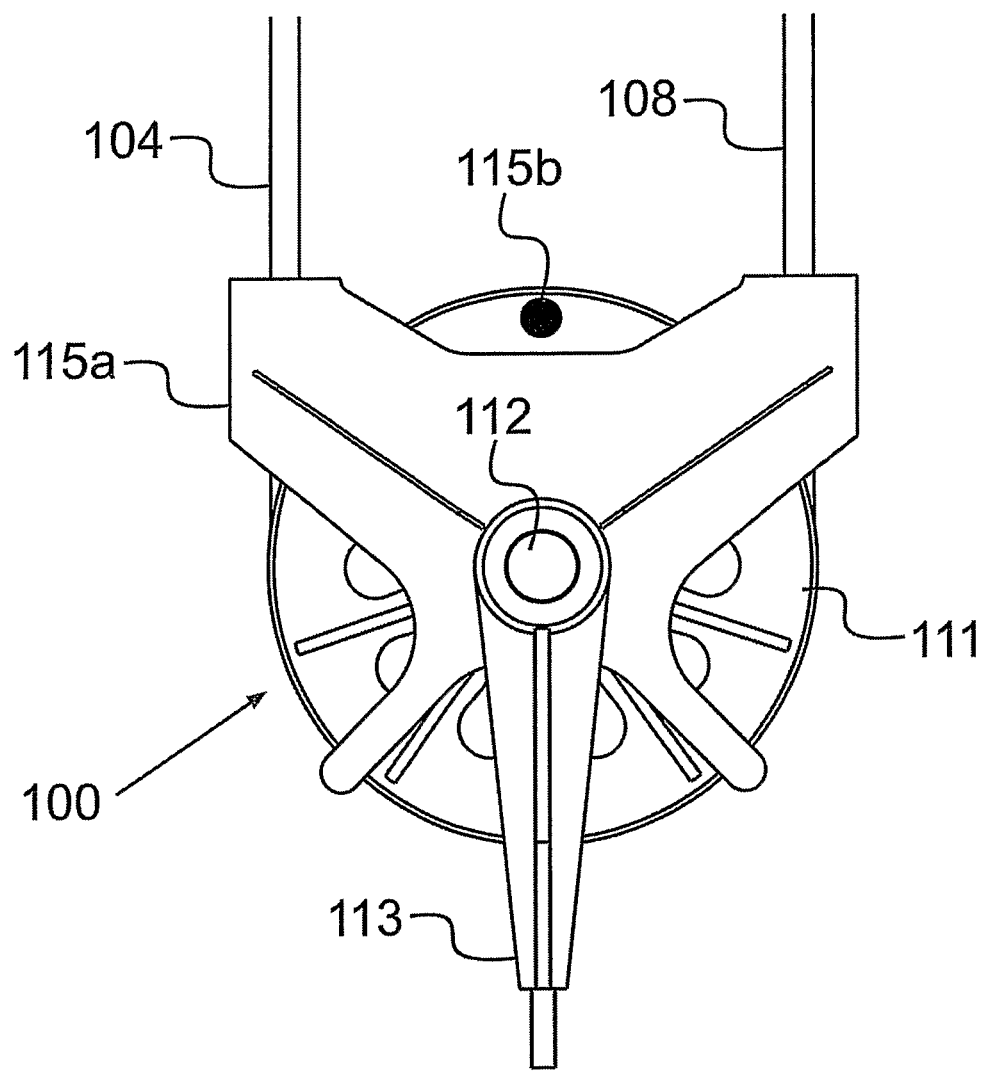
FIG. 4 is a schematic representation of a first embodiment of a subsea marine load raising and lowering system according to the second aspect of the invention.

In FIG. 4 a part of a subsea marine load raising and lowering system 100 according to a second aspect of the invention is schematically shown. Only the distinctive part is shown, the system further is similar to the system shown in FIGS. 1 and 3, comprising a first winch comprising first driving means for raising or lowering a first cable portion 104 from the winch, a second winch comprising second driving means for raising or lowering a second cable portion 108 from the winch, and operating means connected to the first and second driving means of the first and second winch for synchronising the driving means so as to perform synchronous raising or lowering of the cable portions 104, 108. The second cable portion 108 is connected to the first cable portion 104 via an equalizing sheave 111 to the fixed axle 112 of which a load connector 113 is connected. The system according to the second aspect is characterized by a safety assembly 115 preventing any substantial further movement of the equalizing sheave 111 in case the cable portions do not operate synchronously, comprising a structure 115a mounted to the axle 112 of equalizing sheave 111 and further comprising a stop 115b arranged on the equalizing sheave 111, not interacting with the structure 115a upon normal operation of the subsea marine load raising and lowering system as shown in FIG. 3. The safety assembly is arranged such that the stop 115b will abut the structure 115a upon rotation of the equalizing sheave 111, occurring upon relative movement of first and second cable portion 104, 108. When stop 115b abuts the structure 115a, the cable portions will slip over the equalizing sheave 111.

The invention claimed is:

1. Subsea marine load raising and lowering system for use on a vessel, which system comprises:
   a first winch comprising first driving means for raising or lowering a first cable portion from the first winch,
   a second winch comprising second driving means for raising or lowering a second cable portion from the second winch,
   operating means connected to the first and second driving means of the first and second winch for synchronising the driving means so as to perform synchronous raising or lowering of the cable portions,
   which second cable portion is connected to the first cable portion via an equalizing sheave to the axle of which a load connector is connected, wherein
first and second overload protection systems provided at both winches for stopping the winch when an overload of the associated cable portion is detected,
a safety assembly preventing any substantial further raising or lowering of the cable portions in case the cable portions do not operate synchronously, comprising a structure mounted to the axle of the equalizing sheave having passages for the cable portions and further comprising stops arranged on each cable portion above and in the vicinity of the structure, but not interacting with the structure upon normal operation of the subsea marine load raising and lowering system,
wherein the safety assembly is arranged such that one of the stops will abut the structure upon relative movement of first and second cable portion such that the other cable portion is subjected to an increased tension and the overload protection system of that other cable portion will enter into force.

2. System according to claim 1, wherein displacement sensors in contact with the operating means are provided measuring the displacement of the first and second cable portion to correct for non-synchronous raising or lowering of the cable portions.

3. System according to claim 1, wherein the structure is pivotably connected to the axle of the equalizing sheave.

4. System according to claim 1, wherein the operating means are electronic operating means.

5. System according to claim 1, wherein the marine load raising and lowering system operates as an abandonment and recovery system.

6. Subsea marine load raising and lowering system for use on a vessel, which system comprises:
a first winch comprising first driving means for raising or lowering a first cable portion from the first winch,
a second winch comprising second driving means for raising or lowering a second cable portion from the second winch,
operating means connected to the first and second driving means of the first and second winch for synchronising the driving means so as to perform synchronous raising or lowering of the cable portions,
which second cable portion is connected to the first cable portion via an equalizing sheave to the axle of which a load connector is connected,
wherein
a safety assembly preventing any substantial further movement of the equalizing sheave in case the cable portions do not operate synchronously, comprising a structure mounted to the axle of equalizing sheave and further comprising a stop arranged on the equalizing sheave, not interacting with the structure upon normal operation of the subsea marine load raising and lowering system,
wherein the safety assembly is arranged such that the stop will abut the structure upon rotation of the equalizing sheave, occurring upon relative movement of first and second cable portion such that the cable portions will slip over the equalizing sheave.

7. Method for lowering a load from a vessel, wherein use is made of a subsea marine load raising and lowering system comprising first and second winches comprising first and second driving means for raising or lowering first and second cable portions from the winches, the winches further comprising first and second overload protection systems for stopping the winches when an overload of the associated cable portion is detected, operating means connected to the first and second driving means of the first and second winch for synchronising the driving means so as to perform synchronous raising or lowering of the cable portions, the method comprising the following steps:
connecting the second cable portion to the first cable portion via an equalizing sheave,
connecting a load connector to the axle of the equalizing sheave,
lowering the cable portions,
wherein
preventing any substantial further raising or lowering of the cable portions in case the cable portions do not operate synchronously by a safety assembly, comprising a structure mounted to the axle of the equalizing sheave having passages for the cable portions and further comprising stops arranged on each cable portion above and in the vicinity of the structure, but not interacting with the structure upon normal operation of the subsea marine load raising and lowering system,
the safety assembly is operating such that one of the stops abuts the structure upon relative movement of first and second cable portion such that the other cable portion is subjected to an increased tension and the overload protection system of that other cable portion will enter into force.

* * * * *